Patented July 23, 1940

2,209,163

UNITED STATES PATENT OFFICE 2,209,163

SILICEOUS PRODUCT AND METHOD OF MAKING SAME

George Kaloustian, Highland Park, Mich., assignor to Cobrecite Corporation, Detroit, Mich., a corporation of Nevada No Drawing. Application July 8, 1939, Serial No. 283,461

10 Claims. (Cl. 106—24)

This invention relates to a siliceous acoustical material of unusually high porosity and sound-absorbent power, and particularly to an improved method of making the same.

It is an important object of the present invention to provide an acoustical material which can be cheaply made and which has unusually high sound absorbing characteristics due to the wide variation in the size of its pores.

A further object of the invention is to provide a sound absorbing material of the type described which is of a uniformly light color and sufficiently strong to stand normal knocks or abrasions.

A still further object of the invention is to provide an acoustical material, which is resistant to moisture and may be utilized as effectively in the walls and ceilings of swimming pools, or the like, as in structures or buildings having a relatively dry atmosphere.

Still further objects and advantages of the invention will appear from the following description and appended claims. Moreover, it is to be understood that the invention is not limited in its application to the details of said description, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

The present invention embodies an improvement over the form of acoustical material and method of making the same which is disclosed in the copending application of Howard S. Nevin and George Kaloustian, Serial No. 283,380, filed July 8, 1939. In the aforesaid joint application, there is disclosed a novel form of acoustical board embodying a mass of volcanic glass aggregate particles bonded together at their points of contact by a water insoluble complex alumino-silicate bond leaving intercommunicating voids between the particles. It is found that the best results are secured in the manufacture of the above mentioned material when graded aggregate particles of relatively uniform size are used, but it is found desirable to have a wider variation in the size of the openings of intercommunicating passages of the resulting product than it is possible to secure in accordance with the aforementioned joint application.

Accordingly, in accordance with the present invention, the method of the aforesaid joint application is varied by the addition to the mix of an inert material such as crystalline salt which will not react in any way with the remaining materials in the mix during firing, but which upon completion of the firing may be washed out of the porous product by water or weak acids, thus leaving additional inter-communicating voids and spaces of any desired range in size. It is found that when this expedient is utilized that the resulting product has a somewhat higher index of sound absorption, and that the index of sound absorption is high for a wider range of sound frequencies. Moreover, due to the additional voids and intercommunicating spaces the material is lighter and it is found unnecessary to grade the aggregate particles with the same degree of care. While it is preferred to utilize a volcanic glass as the aggregate material in the improved method, a further advantage of the latter method resides in the fact that satisfactory acoustical boards may be prepared in accordance therewith from a wide variety of siliceous aggregates in addition to volcanic glass.

In general, the acoustic material of the present invention is prepared by admixing a predetermined amount of a siliceous aggregate of suitable particle size with a relatively small amount of a bonding agent or flux. The flux is preferably added in solution in water, although it is sometimes necessary to first wet the aggregate and then add the flux in a finely powdered form, as where the flux is relatively hard to dissolve in water. The resulting mixture of aggregate and flux is then preferably screened to break up excessive agglomeration, after which a quantity of water soluble material in particle form, which is inert to the other ingredients and does not melt at the firing temperatures employed, is admixed therewith. Common salt is most suitable for this purpose, although any other material which is soluble in water or weak acids, and which remains solid and inert with respect to the aggregate and flux at the firing temperatures may be used. The resulting mixture is then fired under controlled conditions, involving control of the duration and temperature of firing, the amount of flux employed, and the relative size of the particles of aggregate and inert materials, to obtain a bonded product having interconnected pores extending therethrough. Thereafter, the material is cooled, and the inert material washed out to provide addition pores which in this instance in particular are of widely varying size. Substantially identical results may thus be obtained over constant periods of firing and with particles of aggregate and inert material of relatively constant size by either raising the temperature and decreasing the amount of flux or by lowering the temperature and increasing the amount of flux. The duration of firing may also be varied, in the event that any further change in temperature or the amount of flux is considered undesirable. The size and number of pores present in the finished product, however, is almost entirely determined by the particle size of the aggregate and by the amount and the relative particle size of the inert material present.

A wide variety of siliceous materials, including such substances as sand, feldspar, quartz, and the like, may be used as the aggregate in accordance with the above method, although it has been found that products of better acoustical properties are obtained from material of volcanic origin, such as volcanic glass, pumice, or obsidian. The flux employed is preferably caustic soda, but other alkaline reacting substances, such as soda ash, sodium silicate, or borax, which are capable of reacting with the siliceous and/or aluminous ingredients of the aggregate during the firing to form a silicate or alumino-silicate binder of great strength and resistance to moisture, may be used.

The particle size of the aggregate may be varied widely with substantially equally good results. If the bulk of the particles are too fine, however, for example of the order of 300 mesh, they tend to agglomerate and are difficult to uniformly and thoroughly wet. It is, accordingly, desirable to utilize aggregate particles which are mainly within the limits of approximately 30 to 200 mesh. As previously stated, the size of the pores in the final product is largely controlled by the size of the aggregate and salt particles or other particles of inert material employed. It is, therefore, highly desirable to keep these particles within certain predetermined limits which have been found to be productive of a material of sufficient strength and at the same time of sufficient porosity for the intended purposes. The mesh size of the inert material used may be varied as desired, but satisfactory results have been secured with an inert material that passes approximately 100% through an 8 mesh screen. Upon washing out particles of this size, a product is obtained having a large number of pores of widely differing size, which greatly adds to its sound absorption powers. In general, the pores produced by washing out the inert material are larger than the pores between the aggregate particles, and in fact larger than the aggregate particles themselves.

The preferred ratio of aggregate to flux is approximately 9 parts by weight of aggregate to 1 part by weight of flux. When using this ratio, a satisfactory bond can be obtained by firing the mixture up to temperatures between approximately 1300° and 1700° F., depending upon the kind of flux used, over a period of from approximately 1½ to 3 hours. If the flux used is caustic soda, the firing temperature would be between 1300° and 1400° F. If desired, the relative amount of flux employed may be increased until 1 part of flux is admixed with as little as 3 parts of aggregate. Such mixtures do not require temperatures as high as the preferred ratio of 9 to 1, yet they are somewhat less desirable due to the greater cost of the flux. Lesser amounts of flux may also be used, for example as little as 1 part of flux to 19 parts of aggregate, but in this instance also results are not entirely satisfactory, as such ratios require considerably higher firing temperatures, e. g. of the order of 1600° to 1900° F., which also adds to the cost of manufacture. Further, when using less flux than usual, it is much more difficult and sometimes practically impossible to obtain as white an end product as can be obtained by the preferred methods. The preferred range is from 5 to 9 parts of aggregate to 1 part of flux, the top firing temperature of which varies from 1200° to 1700° F., depending upon the kind of flux used. If caustic soda is used within this range, the firing temperature would be between 1200° and 1400° F. The firing temperatures given are those required for rapid firing. Lower temperatures may be employed provided the material is fired for a longer time. For example, a mixture of one part caustic soda and nineteen parts volcanic glass may be fired at 1400° F. if that temperature is held for several hours. It may be stated in general, however, that any one of the factors or variables mentioned may be varied within limits with substantially identical results, primarily by simultaneously adjusting the other factors accordingly. It will be understood, of course, that the firing temperature of the material should be less than the melting temperature of the inert material used, which temperature, in the case of ordinary salt, is slightly above 1400° F., in the presence of caustic soda.

Although the preferred ratio of aggregate and flux to inert material is about 3 to 2, i. e. 60% aggregate and flux and 40% inert matter, based on the entire mixture, the percentage of the inert material may be varied from 20% to 70% without substantial loss in the sound absorbing properties of the final board.

A more complete understanding of the invention can be obtained from the following examples:

Example 1

9 parts by weight of volcanic glass which have been screened through a 60 mesh screen are treated with a solution consisting of 1 part of caustic soda dissolved in 1 part of water, preferably in the form of fine spray to insure a uniform distribution of the caustic solution. The resulting mixture is then preferably screened through a 10 mesh screen to break up excessive agglomeration and thereby further insure a uniform mixture. Then 8 parts of crystalline rock salt which has been screened through an 8 mesh screen are added to the screened volcanic glass and caustic soda mixture, and after the salt has been uniformly distributed therethrough, the mixture is placed in pans suitable for immediate firing in a high temperature furnace. The firing is then carried out in accordance with the following table:

| Temperature of firing | Duration of firing |
|---|---|
| | Minutes |
| 1200° F. to 1240° F | 15 |
| 1240° F. to 1280° F | 15 |
| 1280° F. to 1320° F | 15 |
| At 1320° F | 90 |

After firing the material is cooled to room temperature, after which it is trimmed to size by sawing. The salt is then dissolved out by placing the resulting tile or board in a water bath or under running water, the density of the resulting board being about 24 lb. per cubic foot. As a result of the above method it is possible to cool the material much more quickly than is usually the case with fired materials, and particularly puffed materials. This is due to the fact that the board is so highly porous that it permits a quick equalization of excess heat out through its surfaces, a factor which practically entirely removes the danger of fracture. In fact, the cooling has been found to be so quick that it is even possible at times to remove the fired material from the furnace directly into the open air.

*Example 2*

88 parts by weight of volcanic glass which have been screened through a 60 mesh screen are treated with 12 parts by weight of flaked caustic soda dissolved in 12 parts of water. The resultant mixture is preferably screened through a 10 mesh screen to break up excessive agglomeration and thereby further insure a uniform mixture. Then 4 parts by weight of crystalline rock salt, which may be of a size range of either 3 to 18 mesh or 8 to 50 mesh, are added to 6 parts by weight of the above mixture. After the salt has been uniformly distributed throughout the caustic soda-volcanic glass mixture, the mixture is placed into pans and immediately fired in accordance with the following table:

| Temperature of firing | Duration of firing |
| --- | --- |
|  | *Minutes* |
| 1000° to 1150° F | 30 |
| 1150° to 1200° F | 15 |
| 1200° to 1250° F | 15 |
| 1250° to 1300° F | 15 |
| 1300° to 1320° F | 15 |
| At 1320° F | 20 |

After cooling sufficiently to handle, the salt is dissolved out by placing the material in a water bath, using either hot or cold water. The material is trimmed to size either before or after the salt is dissolved out.

It is to be understood that the methods described in the above examples may be readily varied as follows: (1) by lowering the firing range and increasing the percentage of flux, (2) by lowering the percentage of flux and simultaneously raising the firing range, (3) by varying the duration of firing to compensate for changes in the variables of (1) and (2), and (4) by varying the particle size of volcanic glass and/or the salt to obtain a product of greater or less density and porosity. The amount of water added to the mixture before firing should not be materially increased above the amounts given in the above examples since excessive water forms a slurry and tends to dissolve the salt and to prevent a bonding of the material. If water is added in an amount equal to the caustic or flux, as in the above examples, there will be sufficient moisture present to wet all particles of the volcanic glass but not sufficient to cause any material dissolving of the salt.

During the firing care should be taken not to heat the material at temperatures high enough to cause puffing. Puffing temperatures vary inversely with the amount of flux added, and at the preferred ratio of 9 parts of aggregate and 1 part of flux, using caustic soda, are generally above 1400° F. When using the firing or bonding temperatures and the relative amounts of flux described herein, however, the material being treated actually shrinks instead of puffing.

The methods described herein render it possible to obtain an acoustic board which reflects an exceedingly small percentage of the sound which strikes it, due to the fact that the removal of the salt particles produces pores of widely differing size. The board is at the same time strong and light in weight and of such color as to render it suitable for use in all possible places where acoustic materials may be required. Moreover, the product may be readily tinted, and is always free of undesirable marks or discolorations. It is also entirely moisture resistant and will not disintegrate or break down upon being used on the walls of swimming pools or other extremely moist places.

The term "volcanic glass" used throughout the specification is intended to cover such volcanic materials as pumice, obsidian, or the like. One such material existing in large deposits near Cobre, Nevada, has been found to be most suitable, since it is unusually soft, having been deposited under water. However, volcanic glass and pumices of other regions, and even such siliceous materials as sand, feldspar, quartz, and the like, may be used with almost equal success.

The use of caustic soda as a fluxing agent is preferred, as it produces a whiter and stronger product, but satisfactory results may also be obtained with soda ash, particularly soda ash containing rather large amounts of caustic soda admixed therein. Borax and sodium silicate may also be used to advantage, although sodium silicate is less desirable, since it must be used in such large quantities. In any case, however, it is desirable that the flux used should be capable of reacting in situ with the siliceous and aluminous ingredients of the volcanic glass during the firing, as otherwise a sufficiently strong and water resistant bond is not obtained.

What is claimed is:

1. The method of making an inorganic water insoluble material in the form of a unitary block having a multiplicity of intercommunicating pores or voids therein which comprises admixing particles of siliceous material with an alkaline reacting fluxing material and with a removable inert material of higher melting point than said fluxing agent, subjecting the resulting mixture to the action of heat sufficient to cause the formation of a water insoluble bond between said particles of siliceous material at their points of contact by inter-action between said particles and said agent, cooling the bonded mass, and removing said inert material.

2. The method of making an inorganic water insoluble material in the form of a unitary block having a multiplicity of intercommunicating pores or voids therein which comprises wetting particles of siliceous material with an aqueous solution of an alkaline reacting fluxing agent, admixing a removable inert material of higher melting point than said fluxing agent with said wetted siliceous material, subjecting the resulting mixture to the action of heat sufficient to cause the formation of a water insoluble bond between said particles of siliceous material at their points of contact by inter-action between said particles and said agent, cooling the bonded mass, and removing said inert material.

3. The method of making an inorganic water insoluble material in the form of a unitary block having a multiplicity of intercommunicating pores or voids therein which comprises wetting particles of siliceous material with water, admixing an alkaline reacting fluxing agent in powdered condition and a removable inert material of higher melting point than said fluxing agent with said wetted particles, subjecting the resulting mixture to heat sufficient to cause the formation of a water insoluble bond between said particles of siliceous material at their points of contact by inter-action between said particles and said agent, cooling the bonded mass, and removing said inert material.

4. The method of making an inorganic water insoluble material in the form of a unitary block having a multiplicity of intercommunicating pores or voids therein which comprises wetting particles of siliceous material with a solution of one part of an alkaline reacting fluxing agent and one part of water, said siliceous material and said fluxing agent being present in a ratio varying from five to nine parts by weight of siliceous material to one part by weight of fluxing agent, admixing a soluble inert material of higher melting point than said fluxing agent with said wetted particles, subjecting the resulting mixture to the action of heat sufficient to cause the formation of a water insoluble bond between said particles of siliceous material at their points of contact by inter-action between said particles and said agent, cooling the bonded mass, and dissolving out said inert material.

5. The method of making an inorganic water insoluble material in the form of a unitary block having a multiplicity of intercommunicating pores or voids therein, which comprises wetting particles of siliceous material selected from the group consisting of volcanic glass quartz, feldspar sand, and ground glass with a solution of one part of an alkaline reacting agent and one part of water, said siliceous material and said fluxing agent being present in a ratio of about five to nine parts of siliceous material to one of the alkaline reacting agent, admixing an inert material of a higher melting point than said fluxing agent with said wetted particles, subjecting the resulting mixture to the action of heat sufficient to cause the formation of a water insoluble bond between said particles of siliceous material at their points of contact by inter-action between said particles and said agent, cooling the bonded mass, and dissolving out said inert material.

6. The method of making sound absorbent material in the form of a unitary block having a multiplicity of intercommunicating pores or voids therein which comprises wetting particles of volcanic glass with a solution of one part of an alkaline reacting fluxing agent and one part of water, said volcanic glass and said fluxing agent being present in a ratio of about five to nine parts volcanic glass to one part fluxing agent, admixing a soluble inert material of higher melting point than said fluxing agent with said wetted particles, heating the resulting mixture to a temperature sufficient to cause the formation of a water insoluble bond between the particles of volcanic glass at their points of contact by inter-action between said particles and said agent, cooling the bonded mass, and dissolving out said inert material.

7. The method of making an inorganic water insoluble material in the form of a unitary block having a multiplicity of intercommunicating pores or voids therein which comprises mixing from five to nine parts of particles of volcanic glass with approximately one part of water and one part of an alkaline reacting fluxing agent selected from the group consisting of caustic soda, soda ash, sodium silicate, and borax, admixing a soluble inert material of higher melting point than said fluxing agent with said wetted particles, heating the resulting material up to a temperature sufficient to cause the formation of a water insoluble bond between the particles of volcanic glass at their points of contact by inter-action between said particles and said agent, cooling the bonded mass, and dissolving out said inert material.

8. The method of making an inorganic water insoluble material in the form of a unitary block having a multiplicity of intercommunicating pores or voids therein which comprises wetting particles of volcanic glass with an aqueous solution of caustic soda, admixing water soluble inert material of higher melting point than said caustic soda with said wetted particles, subjecting the resulting mixture to the action of heat sufficient to cause the formation of a water insoluble bond between the particles of volcanic glass at their points of contact by inter-action between said particles and said caustic soda, cooling the bonded mass, and dissolving out said inert material.

9. The method of making an inorganic water insoluble material in the form of a unitary block having a multiplicity of intercommunicating pores or voids therein which comprises wetting particles of volcanic glass with an aqueous solution of caustic soda, consisting of one part by weight of caustic soda dissolved in about one part by weight of water, admixing said wetted particles with common salt, subjecting the resulting mixture to the action of heat sufficient to cause the formation of a water insoluble bond between the particles of volcanic glass at their points of contact by inter-action between said particles and said caustic soda, cooling the bonded mass, and dissolving out said salt.

10. The method of making an inorganic water insoluble material in the form of a unitary block having a multiplicity of intercommunicating pores or voids therein which comprises wetting volcanic glass with a solution of caustic soda consisting of one part by weight of caustic soda dissolved in one part by weight of water, said volcanic glass and said caustic soda being present in a ratio of about 7 to 1, admixing rock salt of a particle size which will pass an eight mesh screen with said wetted particles, said rock salt being present to the extent of from 20 to 70% of the entire mixture, heating the wetted particles up to a temperature sufficient to cause the formation of a water insoluble bond between the particles of volcanic glass at their points of contact by inter-action between said particles and said agent, cooling the bonded mass, and dissolving out said salt.

GEORGE KALOUSTIAN.